US007331852B2

(12) United States Patent
Ezell et al.

(10) Patent No.: US 7,331,852 B2
(45) Date of Patent: Feb. 19, 2008

(54) METHOD AND APPARATUS FOR SAMPLING AND CONTROLLING VENTILATION AIRFLOW INTO A STRUCTURE

(76) Inventors: George D. Ezell, 1519 Comanche Ct., Granbury, TX (US) 76048; Lynn B. Heitman, 4711 Sycamore, La., TX (US) 75002

( * ) Notice: Subject to any disclaimer, the term of this patent is extended or adjusted under 35 U.S.C. 154(b) by 0 days.

(21) Appl. No.: 10/460,755

(22) Filed: Jun. 12, 2003

(65) Prior Publication Data
US 2004/0253918 A1    Dec. 16, 2004

(51) Int. Cl.
F24F 7/06    (2006.01)
(52) U.S. Cl. ............. 454/229; 454/239; 340/632
(58) Field of Classification Search ........ 454/229, 454/239, 256; 340/627, 632
See application file for complete search history.

(56) References Cited

U.S. PATENT DOCUMENTS

| 4,007,875 | A | * | 2/1977 | Stolz et al. | ............ 237/12.3 A |
| 5,597,354 | A | * | 1/1997 | Janu et al. | ................. 454/229 |
| 5,648,914 | A | * | 7/1997 | Bauer et al. | ................ 702/19 |
| 6,583,726 | B1 | * | 6/2003 | Johnson et al. | ............. 340/627 |
| 2001/0053667 | A1 | * | 12/2001 | Kreichauf | .................... 454/239 |
| 2002/0098794 | A1 | * | 7/2002 | Krafthefer | ................... 454/370 |
| 2003/0211826 | A1 | * | 11/2003 | Faltesek et al. | ............. 454/338 |
| 2004/0058637 | A1 | * | 3/2004 | Laiti | ......................... 454/229 |

* cited by examiner

Primary Examiner—Gregory Wilson

(57) ABSTRACT

A totally integrated ventilation system is contained in the outside air inlet stream. The system samples and controls ventilation airflow as it enters a structure. An air valve connecting the outside air inlet stream to the return plenum is controlled by a valve positioning device and a processor that monitors sensors located in the outside air inlet stream, air quality data provided by a telecommunications link and the HVAC system control signals. The air quality data includes locally broadcast air pollution data or air quality alert data related to accidents or terrorist attacks. The processor and valve positioning device simultaneously control a separate pressure relief valve that allows contaminated air to be exhausted from the structure. An alternate configuration uses a supplemental fan to introduce the outside air inlet stream directly into the structure where HVAC systems are not used. A status and control panel that provides an interface to the occupants or an automation system is provided along with a test box that can monitor the processor to determine the total volume of ventilation air introduced into the structure. This test data is used to program processor timing inputs to achieve desired ventilation results.

44 Claims, 9 Drawing Sheets

METHOD AND APPARATUS FOR SAMPLING AND CONTROLLING VENTILATION AIRFLOW INTO A STRUCTURE

TECHNICAL FIELD OF THE INVENTION

The present invention pertains in general to a method and apparatus for sampling and controlling the ventilation airflow into a structure, and more precisely, to a method and apparatus for sampling and controlling ventilation airflow using electromechanical methods.

BACKGROUND OF THE INVENTION

Indoor air quality is a paramount issue in the heating, ventilation and air conditioning (HVAC) industry. Modern construction techniques greatly reduce the amount of outside air that is naturally introduced into structures through infiltration. The reduction of infiltration is a by-product of the quest to increase the energy efficiency in these structures. In recent years, great strides have been made in building techniques to provide airtight seals around doors, windows and other openings throughout these structures. All joints and cracks around the ceilings, walls and floors are carefully sealed during construction and all openings in these interior surfaces are made airtight. Air conditioning ceiling registers, the associated ductwork and the air handling systems are sealed to eliminate virtually all infiltration. The overall quality of structural sealing is measured using blower doors temporarily installed in a doorway to raise the air pressure inside the structure and determine the amount of air leaking from the structure. Infrared thermometers are used to identify and seal infiltration sources that change the air temperature inside the structure.

Increased structural energy efficiency combined with higher efficiency heating and cooling systems result in shorter run times and longer run intervals in the HVAC systems. This effect is causing increased air stagnation problems inside these modern structures. Carbon dioxide levels rise rapidly in smaller rooms with multiple occupants where air exchange times are short and infrequent. This problem is also exacerbated, during temperate weather periods, by personal security concerns associated with opening windows to provide natural outside air ventilation. The potential threat of airborne toxins that can be spread either by accident or by terrorist organizations has caused further concerns about the use of natural ventilation.

A wide array of synthetic building materials, such as carpeting, drapes, paint and vinyl flooring that naturally emit hazardous chemical vapors, are being used inside these structures. Combustible materials such as oil, gas, wood and tobacco products, building materials, cleaning and maintenance materials and pesticides provide additional sources of hazardous chemical vapors. This brew of chemicals, combined with the carbon dioxide naturally produced by the inhabitants, are causing respiratory problems. These problems seem to be more prevalent in higher humidity areas where higher levels of water vapor interact with the chemicals to produce other chemical compounds. The respiratory problems are particularly acute in children and the elderly. Standards established by the American Society of Heating, Refrigeration and Air Conditioning Engineers (ASHRAE Standard 62-1999, "Ventilation for Acceptable Indoor Air Quality") require an average ventilation rate of 15 cubic feet per minute (CFM) of fresh air per person in structures. The average household size in the United States now stands at about 2.8 occupants per residence and this equates to an average of 42 CFM of outside air to be introduced on a continuous basis to every residence in the United States. This ventilation flow rate represents about three and one half percent of the total airflow produced by a 1200 CFM system fan, which equates to about three tons of cooling capacity. If this system runs intermittently for only one third of the time then the corresponding percentage increases to about ten and one half percent or 126 CFM. Few modern structures meet this standard.

Some notable efforts have been made in prior art to help alleviate these indoor air quality problems. A device (Rudd, U.S. Pat. No 6,431,268) was developed that monitors the time interval between operation of the HVAC system, or the operation of an outside air damper, and creates additional operating cycles of these devices to help alleviate problems associated with stagnant indoor air quality. Another approach (Riley et al., U.S. Pat. No. 6,467,696) uses continuously operating variable speed system fans that bring in outside air, mix the outside air with the indoor air and distribute the air throughout the structure. An earlier approach (Janu et al., U.S. Pat. No. 5,597,354) controls a single system fan and uses separate chambers for return air and outside air with associated dampers that control the airflow volumes in each chamber. A separate outside air damper is controlled to provide a variable intake of outside air. The invention supports a variety of pressure and contamination sensors located in both indoor and outside locations.

In response to the need to improve indoor air quality, some structures have been equipped with continuously open outside air ducts that include a manually adjustable damper to control how much outside air is introduced on a continuous basis while the system fan is operating. Such systems can cause dramatic reductions in the HVAC operating efficiency and in effect are similar to leaving a window or door partially open at all times. Other systems use an electrically controlled damper that opens when the system fan is operated and closes when it stops. Although this implementation does reduce air infiltration when the system fan is not running, these dampers typically do not provide an airtight seal when closed and some infiltration occurs when the dampers are closed. This infiltration problem is compounded by the buildup of static pressure inside the structure caused by introducing ventilation air and not providing a method to exhaust contaminated air. The increased pressure inside the structure above normal atmospheric pressure outside the structure also acts to limit the flow of ventilation air while the system fan is running. These systems introduce outside air even when the air is particularly hot, cold, humid or contaminated. The injection of extremely cold air during the heating season or extremely hot or humid air during the cooling season may result in significant decreases in energy efficiency. Injecting contaminated air reduces indoor air quality. Conversely, when the outside air is suitable for ventilation, these systems do not purposefully supplement the normal system fan operation to allow more ventilation. These periods typically occur in the spring and fall of the year when outdoor conditions often dictate the infrequent operation of an HVAC system.

Prior art has not considered sampling the condition of the outside air inlet stream as it enters the structure or the need to provide additional cycles of ventilation air whose quality is controlled to achieve proper ventilation. These prior art systems have not been widely accepted and are typically impractical for use in existing structures due to their cost and complexity. These systems are typically provided as separate devices that only address smaller aspects of total ventilation system needs. There are no standards available for installing and interfacing these separate devices and consequently there is wide variety of ventilation results. There is a need for fully integrated ventilation systems that address the total ventilation needs of a structure. These systems need to be simpler, lower in cost and more compact in size so they can be readily added to any structure. The limitations posed by the buildup of static pressure inside the structure have also been generally handled as a separate capability that is not fully integrated with the ventilation system. The availability of local air pollution data, including the potential release of airborne toxins has not been considered as a component of ventilation systems. The rapid communication of this alert situation, to all structures in an affected area, to curtail natural ventilation, has not been previously considered. The primary emphasis of prior art has been on limited capability systems that stir stagnant air inside the structure or monitor indoor sensors and supply enough fresh air to satisfy indoor air quality requirements. Accordingly, there is a need for a method and apparatus that provides a fully integrated system for sampling and controlling the outside air inlet stream as it enters the structure so that air quality, energy efficiency and personal safety are all attained in concert.

SUMMARY OF THE INVENTION

The present invention disclosed and claimed herein comprises a method and fully integrated apparatus for sampling and controlling ventilation airflow as it enters a structure and simultaneously allowing contaminated air to be exhausted from the structure. Basic system components are an outside air collection device, an air screening device, an air duct, a damper and an air valve that collectively provide a path for an outside air inlet stream to enter the structure via the return plenum of an HVAC system. An alternate configuration, for use in those structures that do not use a central HVAC system, uses a supplemental fan to introduce the outside air inlet stream into the structure. The system can be installed on the wall of the return plenum or mixing chamber, anywhere between the return plenum or mixing chamber and the outside air collection device, on the outside air collection device or as part of the device. The air valve is moved by a valve positioning device which is controlled by a processor that monitors the HVAC system control signals and sensors located in the outside air inlet stream to determine when to open and close the air valve and a separate pressure relief valve, located inside the structure, that allows contaminated air to be exhausted. Air inlet stream sampling is accomplished by ignoring sensor inputs for a brief period following the initial air valve opening to allow stagnant air, contained in the ventilation system, to be expelled before actual sensor readings are taken. Additional system components include a telecommunications link that allows locally broadcast air pollution data or air quality alert data, related to accidents and terrorist attacks, to be received and used by the processor, a remote panel that provides an interface to the occupants or an automation system and a test box that can monitor the processor to determine the total volume of ventilation air introduced into the structure. This test data is used to program the processor to achieve the desired ventilation results.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
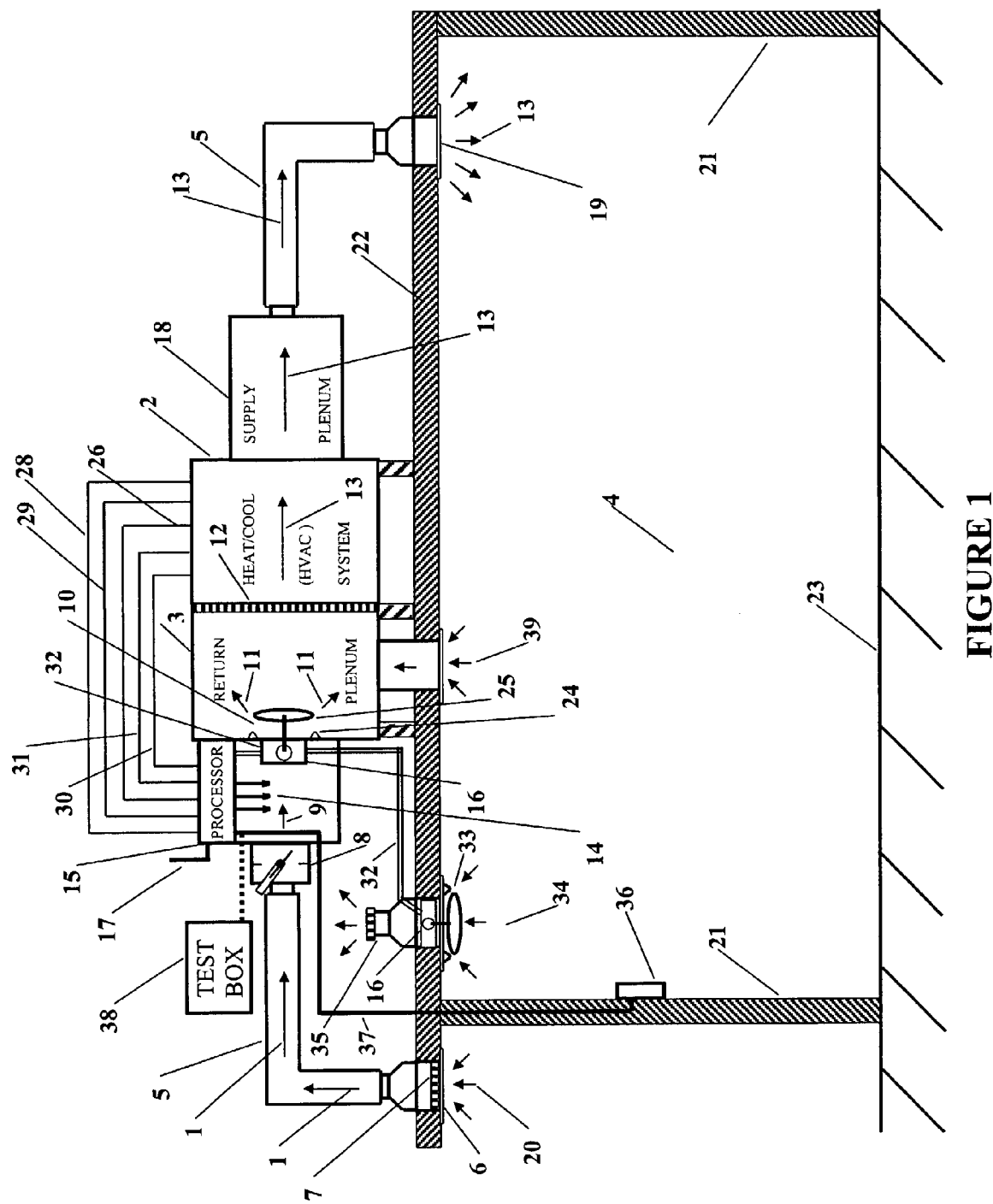
FIG. 1 illustrates a cross-sectional view of a structure showing the system of the present invention.

Referring to FIG. 1, there is illustrated a cross-sectional view of a structure showing the system of the present invention, which comprises a method and fully integrated apparatus for sampling and controlling an outside air inlet stream 1 to determine if it is suitable for introduction into an HVAC system 2 via a return plenum 3 to improve indoor air 4 quality. Although FIG. 1 illustrates an attic mounted HVAC system configuration, it should be noted that the HVAC system and the system of the current invention can be located anywhere within the structure or outside the structure. Basic system components include at least one air duct 5 that connects to an outside air collection device 6, an air screening device 7 to keep out unwanted pests, a damper 8 that provides a flow rate controlled air inlet stream 9, an air valve 10 that allows qualified air 11 to mix with inside return air 39 and to enter the HVAC system 2 through at least one air filter 12 that provides filtered qualified air 13, one or more sensor 14 located in the flow rate controlled air inlet stream 9, that monitor physical or chemical characteristics of the flow rate controlled air inlet stream 9, a processor 15 and a valve positioning device 16. An air duct 5 is composed of flexible or rigid air paths and is made of any material that will allow air to flow with minimal flow restriction. Air valve 10 is similar to a water valve in function. It contains both a fixed seat 24 and movable seat 25. It prevents any airflow when the movable seat 25 is fully closed against the fixed seat 24. The amount of airflow that occurs when the air valve 10 is open is directly proportional to the distance between the fixed seat 24 and the movable seat 25. Although this type of air valve 10 offers many advantages, other types of air valves and air control devices, including traditional blade dampers, may be used to control airflow. An air filter 12 is a device that removes contaminants from the qualified air 11. A sensor 14 is a device that measures some physical or chemical property of the flow rate controlled air inlet stream 9. Examples include air temperature, humidity, particulate concentration, carbon monoxide content and carbon dioxide content. Outside air 20 is available at any air collection device 6 installed in the outside walls 21, ceiling 22, doors, windows, roofs, floor 23, or outside eaves of a structure. Such openings are typically protected from rain or other sources of moisture by mechanical design.

The processor 15 receives inputs from the sensor 14 and data and control signals from remote devices via a telecommunication device 17 and determines when to open an air valve 10 and introduce qualified air 11 into the HVAC system 2. The processor 15 can be as simple as a logic controller that monitors sensor switches or as complex as a microprocessor that reads sensor data on a continuous basis and relies on predetermined or adaptive ventilation decision algorithms. The telecommunication device 17 may also be used to transmit any air quality system information to a remote point or to receive any information that is essential to the system. Certain forms of air contamination such as pollen and fungus concentrations are typically measured at special locations affiliated with local television stations. Such figures are now generally broadcast as part of local weather forecasts. Such air contamination data can be transmitted in numeric form by data communications methods. Other forms of air quality sensor data that can be transmitted include the issuance of a warning of the imminent threat of the dispersal of a toxin either as an accident or as a result of a terrorist act. The National Weather Service (NWS) and the National Oceanic and Atmospheric Administration (NOAA) have joined forces to provide an all hazards public warning system that is broadcast via the NOAA Weather Radio (NWR) network using Specific Area Message Encoder (SAME) technology, which includes terrorist attack and toxin dispersal warning data by county. Sensor 14 herein include any device such as a radio receiver or telecommunications link that can receive environmental data collected at a central point or warning data that may apply to a geographic area. Such data may be received and used by the processor 15 as if the sensors were actually located in the flow rate controlled air inlet stream 9 or the warning was directly communicated to the occupants of the structure.

The HVAC system 2 receives the filtered qualified air 13 as an input and increases the pressure of the filtered qualified air 13 and provides it as an output to the supply plenum 18 where it is distributed to the inside of the structure via an air duct 5 and a supply register 19. The processor 15 receives control signals from the HVAC system 2 that include fan 26, heat 28 and cool 29. The fan 26 is monitored and controlled by the processor 15 to provide ventilation. Power to operate the processor 15 and the valve positioning device 16 are derived from the 24 VAC 30 line and common 31. Although the system is shown as being powered by 24 Volt AC power, it should be understood that the complete system may be powered by any type or AC or DC power and additionally the air valve 10 or the pressure relief valve 33 may be actuated by any type of actuator including pneumatic or hydraulic systems. The processor 15 examines the fan 26 and monitors the sensor 14 along with the data inputs and controls received from the telecommunications device 17 to determine when and how long to open the air valve 10 by supplying control signals to the valve positioning device 16 via a control bus 32 which also connects to the pressure relief valve 33. The pressure relief valve 33 contains a valve positioning device 16 that simultaneously operates in parallel with the air valve 10 and allows contaminated air 34 to be exhausted from the structure as filtered qualified air 13 is introduced into the structure. The exhausted contaminated air 34 passes through a filter screen 35 that keeps unwanted pests out. The exhausted contaminated air 34 may be released into a well-ventilated attic as shown in FIG. 1 or it may be released outdoors by the addition of an air duct. Such release may be augmented by the integration of an exhaust fan with the pressure relief valve 33 or in the attached air duct. In addition, standard exhaust fans may be controlled by the ventilation system. One or more pressure relief valve 33 can be installed as needed in the ceiling 22, the walls 21 or the floor 23 of the structure. The location of each pressure relief valve is chosen to maximize the flow of contaminated air 34. The processor 15 provides user status information and accepts operational control inputs from the remote panel 36 that is connected to the processor 15 by remote panel port 37. The status of the system includes an indication of the air quality status of the sensors 14, the position of the air valve 10 as being open or closed, a system power on indication, a system disabled indication and an audible alert output. The remote panel 36 inputs and outputs are also available as logical signals that may be supplied or originate from a home or office automation system which is not shown in FIG. 1. A test box 38 connects to the processor 15 via remote panel port 37 that is shared with the remote panel 36 and is easily accessed by a service technician. The test box 38 allows the service technician to monitor airflow data collected by the processor 15 to determine how much filtered qualified air 13 is being introduced into the structure. The processor 15 contains internal timers that adjust how long air valve 10 stays open and how often the system fan is operated in a system fan only mode to provide additional ventilation. The test box 38 includes a separate microprocessor with a real time clock and independent humidity and temperature sensors that may be used to collect reference data. A separate computer interface port is provided to connect the test box 38 to a laptop or other personal computer. The computer is used to set up the test box 38 for data collection and to analyze the data that is collected to determine an accurate estimate of the volume of filtered qualified air 13 that is introduced into the structure on a daily basis. The volume of filtered qualified air 13 measured, coupled with knowledge of the number of occupants that are normally in the structure, are used by the service technician to adjust the damper 8 and the counters contained in the processor 15 to provide the correct amount of ventilation. The remote panel port 37 may also be accessed by a home or office automation system not shown in FIG. 1.

Detailed Description of Alternative Air Quality System

Figure 2:
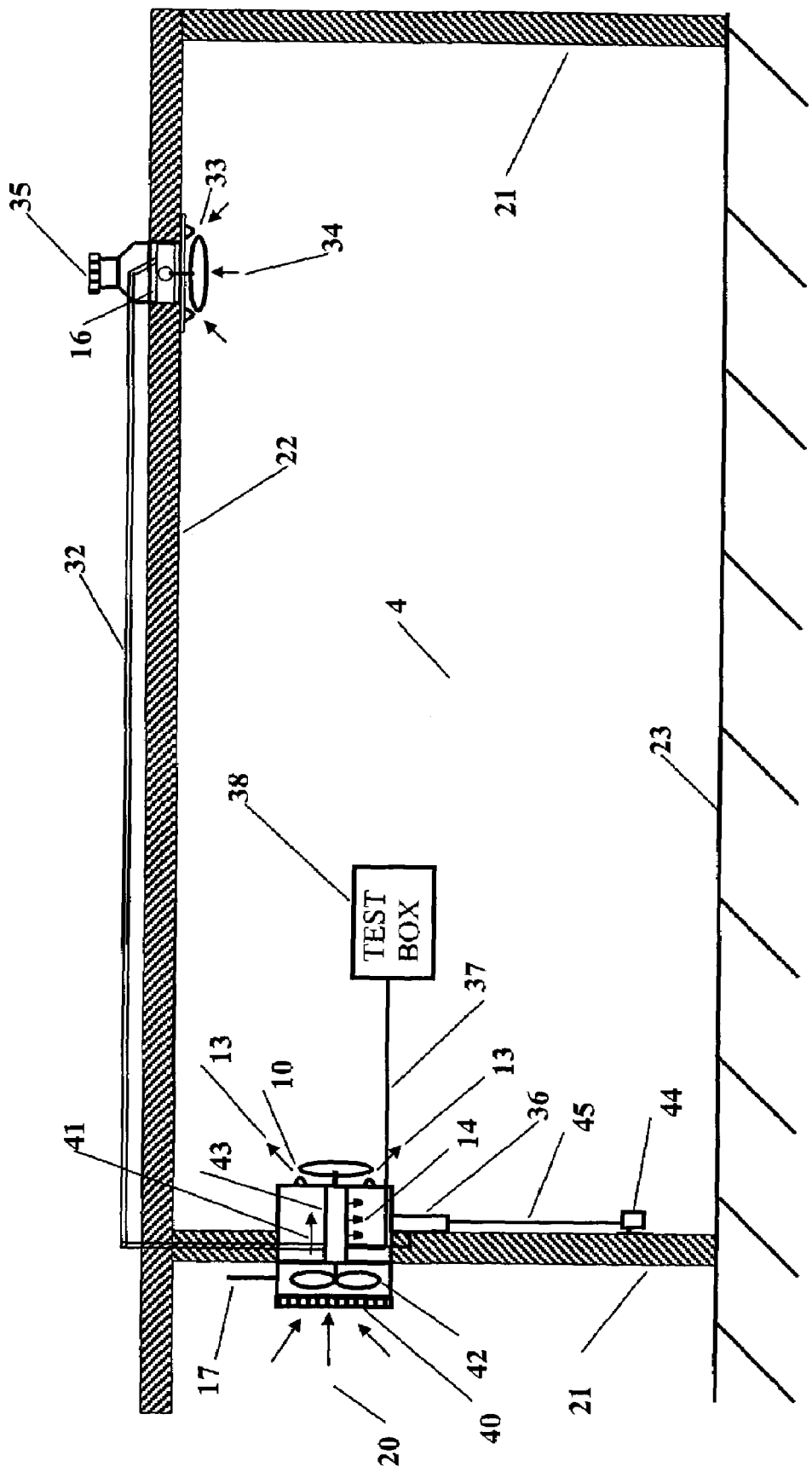
FIG. 2 illustrates a cross-sectional view of a structure showing an alternative system of the present invention.

Referring to FIG. 2, there is illustrated a cross-sectional view of a structure showing an alternative system of the present invention, which comprises a method and fully integrated apparatus for sampling and controlling a filtered air stream 41 to determine if it is suitable for introduction into a structure to improve indoor air 4 quality. Basic alternative system components include a combination air screening and filter device 40 which keeps out unwanted pests and removes contaminates from outside air 20, a supplemental fan 42 that is driven by a processing and control system 43 that combines the processor 15 and valve positioning devices previously described, along with a fan relay and fan motor in a combined system, and a power transformer 44 that plugs into a power outlet that is not shown and a power cord 45 that provides 24 Volt AC power to the processing and control system 43 via the remote panel 36. In an alternate configuration not shown in FIG. 2, supplemental fan 42 may also be relocated near the outlet of air valve 10. Although the alternative system is shown as being powered by 24 Volt AC power, it should be understood that the complete alternative system may be powered by any type or AC or DC power and additionally the supplemental fan 42 or the air valve 10 may be actuated by any type of actuator including pneumatic or hydraulic systems. The processing and control system 43 receives inputs from the sensor 14 and data and control signals from remote devices via a telecommunication device 17 and determines when to open an air valve 10 and introduce the filtered air stream 41 into the structure. The telecommunication device 17 may also be used to transmit any air quality system information to a remote point or to receive any information that is essential to the system as previously described. A test box 38 connects to the processor and control system 43 via a test port 37 that is easily accessed by a service technician. The test box 38 functions as described previously and the test port 37 may be accessed by a home or office automation system not shown in FIG. 2. As previously described, control signals from the processing and control system 43 are provided via a control bus 32 to the valve positioning device 16 located at the pressure relief valve 33. A filter screen 35 is used to keep out unwanted pests. The alternative system may be installed anywhere in the outside walls 21, ceiling 22, doors, windows or floor 23 of any structure.

Detailed Description of Air Quality System

Figure 3:
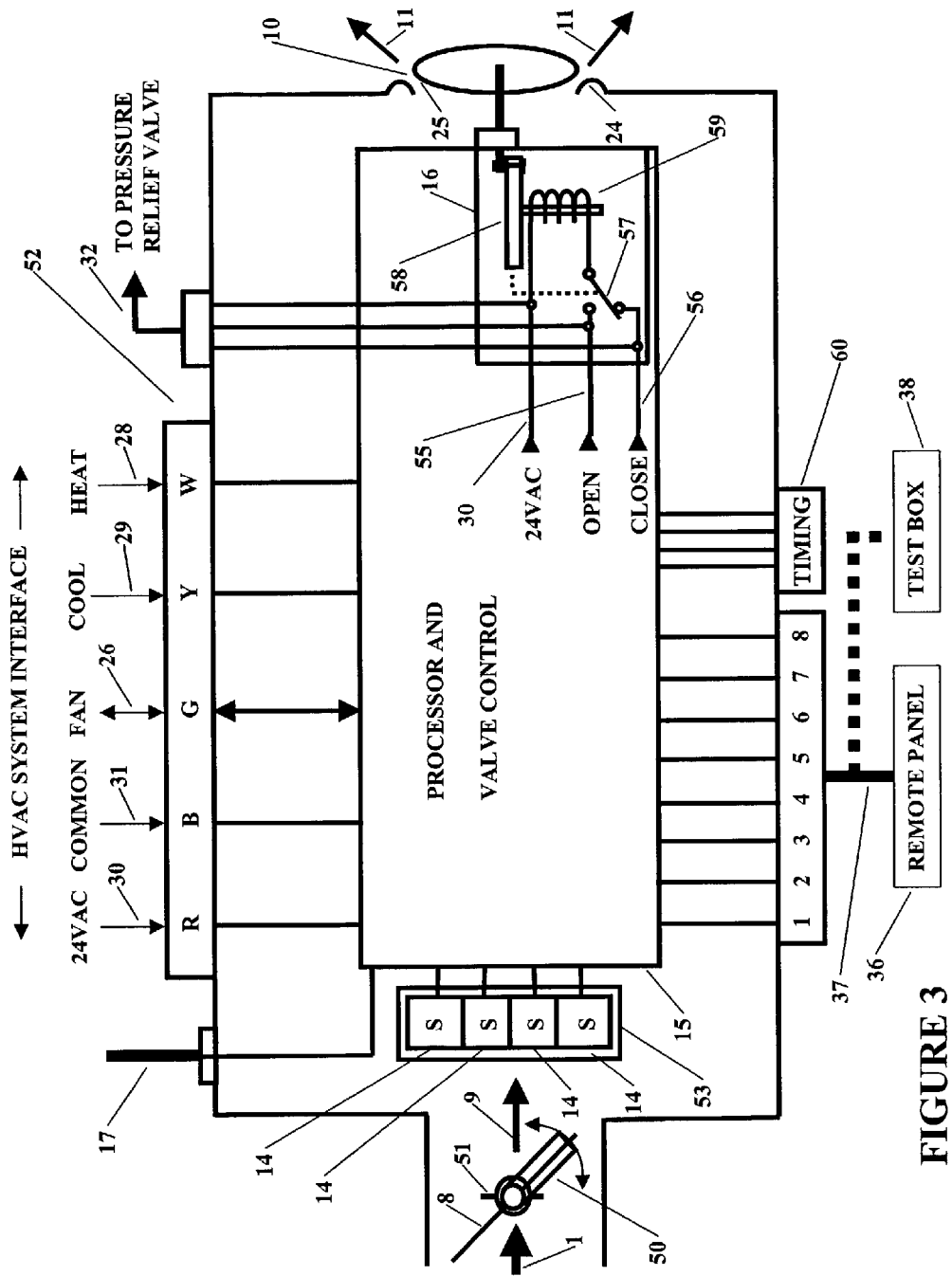
FIG. 3 illustrates a block diagram of the Air Quality System (AQS)

Referring to FIG. 3, there is illustrated a block diagram of the fully integrated Air Quality System (AQS). An outside air inlet stream 1 enters the AQS system through a damper 8 that provides flow rate control via a manually controlled rotating handle 50. Rotating the handle 50 to a vertical position reduces the flow rate controlled air inlet stream 9 to a minimum value, while rotating the handle 50 to a horizontal position maximizes the value. It should be noted that flow rate control may be achieved with any kind of damper including a manually adjustable air valve similar to air valve 10. This capability allows the flow rate controlled air inlet stream 9 to be adjusted to be compatible with the ventilation needs of the structure. Such needs are typically determined by the internal volume of the structure, the average number of occupants factored with the average amount of time the structure is occupied, and the amount of natural ventilation that occurs in the structure. The flow rate controlled air inlet stream 9 is measured and adjusted at installation using typical airflow rate test equipment. The damper 8 is held in a fixed position by locking mechanism 51. The flow rate controlled air inlet stream 9, combined with the total time air valve 10 is held open, or alternately how wide the air valve 10 is held open, determines the total volume of qualified air 11 that is introduced into the structure. It should be noted that the damper 8 is not an essential element of the invention, but rather a coarse front-end adjustment that is used to adjust the AQS to the ventilation needs of specific structures.

The total time the air valve 10 is held open is determined by the processor 15, which receives inputs and may provide outputs to the following: the remote locations that originate environmental data or provide air quality control and status monitoring via the telecommunications device 17, the HVAC System 2 via HVAC System Interface 52, the remote panel 36 via remote panel port 37 and the test box 38, which also shares remote panel port 37. The processor 15 also receives inputs from sensor 14 which are contained on a sensor assembly 53 that is located in the flow rate controlled air inlet stream 9. The processor 15 monitors the sensor 14 to measure physical or chemical characteristics of the flow rate controlled air inlet stream 9. The test box 38 allows an HVAC technician to monitor the operation of the AQS and determine how well the structure is being ventilated over longer periods of time. The data gleaned from the test box 38 may be used to adjust the timing 60 inputs that control the length of the ventilation cycle and the interval between supplemental ventilation cycles. The remote panel 36 provides AQS status and operational control capabilities to the occupants of the structure.

The air valve 10 is positioned by the valve positioning device 16, which receives 24 VAC power from the HVAC system 2 via 24 VAC 30. Two additional output signals are produced by the processor 15 to control valve positioning device 16. These are the open 55 signal and the close 56 signal. These input signals are connected through switch contacts 57 that are controlled by a cam 58 that is attached to the 24 VAC motor 59. The processor 15 causes the air valve 10 to close by applying common 31 to the close 56 input. This causes the 24 VAC motor 59 to rotate the cam 58 until the switch contacts 57 open to interrupt the drive current to the motor 59. This position of cam 58 coincides with the air valve 10 being fully closed. Similarly, the processor 15 causes the air valve 10 to open by applying common 31 to the open 55 input. It should be noted that any kind of motor including those that operate on electrical power, air or vacuum power or hydraulic power may be used to operate the cam 58. It should be further noted that the processor 15 may control the duration of the open 55 signal and the close 56 signal inputs to set the air valve 10 at any required position between fully open and fully closed. This capability allows the processor 15 to control the flow rate of the total volume of qualified air 11 that is introduced into the structure, which can be used to eliminate the need for damper 8.

The 24 VAC 30 signal, the open 55 signal, and the close 56 signal are combined into a redundant parallel wire bus that is called the valve bus 32 which is connected to one or more pressure relief valve 33 or alternately to one or more air valve 10 that may be required in larger systems. All such pressure relief valve 33 and air valve 10 are fully integrated with the AQS system to operate simultaneously.

Detailed Description of the Air Quality System Processor

Figure 4:
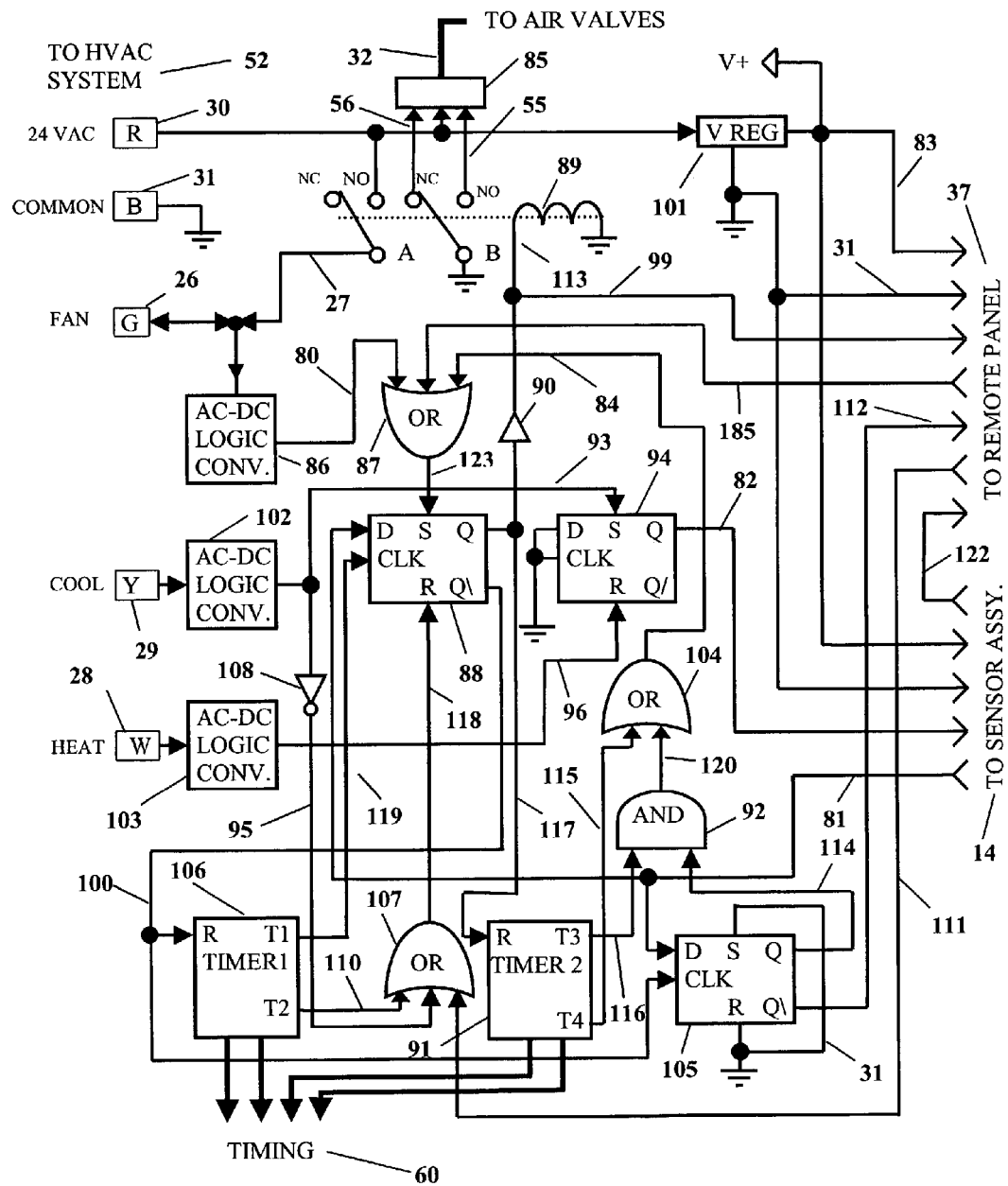
FIG. 4 illustrates a schematic diagram of the Processor and Air Valve positioning assembly.

Referring to FIG. 4, the processor 15 is described. It monitors the status of its associated HVAC system 2 at HVAC system interface port 52 terminals 24 VAC 30, common 31, fan 26, cool 29, and heat 28. From sensor assembly 14, it receives air quality 81 and air quality audible alert 122 and provides Heat/Cool operating status 82, DC power 83 and Common 31 to the sensor assembly 14. It provides a control bus 32 through connector 85 to control the position of one or more associated air valve 10 and pressure relief valves 33. Finally, the processor 15 provides a remote panel port 37 for control and status monitoring at a remote panel 36 and timing 60 inputs that control the length of the ventilation cycle and the time interval between supplemental ventilation cycles.

The normal operating cycle for the Air Quality System is initiated by the application of low voltage 24 VAC 30 to fan 26 by the HVAC system 2 thermostat, which is not shown in the figure. This activates the HVAC system 2 air handler contactor and the system fan is turned on. The 24 VAC 30 signal at fan 26 is connected to the input terminal of AC-DC logic converter 86. This initiates a processor 15 controlled ventilation cycle in the following manner. AC-DC Logic Converter 86 converts the low voltage AC at fan 26 to a DC signal level corresponding to a logical one. The logical one is applied to the first input 80 of OR gate 87 and produces a logical one output that is applied to the SET (S) terminal 123 of Valve Control Flip-Flop 88. The Q output 117 of Valve Control Flip-Flop 88 is forced to its high logic state, applying power to activate relay 89 through relay driver 90 and also applying a logic high to the R (Reset) terminal of TIMER2 91, causing it to assume a reset (count=zero) state. The activation of relay 89 causes its section B contact arm to ground terminal 55 of connector 85 through its normally open contact. This action causes the air valve 10 and any associated pressure relief valve 33 to move to their fully open positions, allowing ventilation air to be pulled into the return plenum 3 for mixing with inside return air 39, while simultaneously allowing contaminated air 34 to be exhausted to the outside through open pressure relief valve 33. Activation of relay 89 also acts to connect 24VAC 30 line to fan out 27 through its Section A normally open contact. This action provides a secondary path for maintaining 24 VAC 30 to fan 26 for assuring that the system fan continues to run for a complete ventilation period. When valve control flip-flop 88 is set, its Q\ output 100 is forced to a logical LOW, releasing the R (Reset) terminal on TIMER1 106 and allowing the timer to run. The high-to-low transition at the CLK terminal of Flip-Flop 105 has no effect since a positive going transition at the CLK terminal is required to initiate a change.

At time interval T1, TIMER1 106 produces a positive transition at the 119 input terminal of Flip-Flop 88. The logic level at the D input of Flip-Flop 88 indicates the current air quality 81 of outside air inlet stream 1 being pulled into the return plenum 3, as determined by an array of sensors located on the sensor assembly 14. A logical high at terminal D input of Flip-Flop 88 indicates good inlet air quality 81, while a logical low at the D input terminal indicates poor air quality 81. Assuming good air quality, the positive CLK transition at time T1 119 simply leaves Flip-Flop 88 in its current on state and all air valve 10 and pressure relief valve 33 remain open. Assuming poor outdoor air quality 81, where the D input of flip-flop 88 is a logical low, the positive CLK transition at time T1 119 causes Flip-Flop 88 to reset and go to its off state. The resulting low level at the Q output 117 turns off relay 89, causing contacts A and B to both return to their de-energized normally closed state, as indicated. Close signal 56 of connector 85 is now connected to common 31 through the normally closed contact of the B section, which causes all air valve 10 and pressure relief valve 33 to move to their fully closed position. Section A is returned to its normally closed state and 24 VAC 30 is removed from fan out 27, returning control of the system fan to the HVAC system 2. The ventilation cycle has been terminated because of poor air quality but the HVAC system 2 continues a normal cycle until the thermostat is satisfied and the 24 VAC 30 signal is removed at fan 26. The processor 15 then waits for another fan 26 signal from the system thermostat to start another ventilation cycle.

The resetting of Flip-Flop 88 forces its Q output 117 low and removes the reset at the R terminal of TIMER2 91, allowing it to begin counting. The logical high at the Q\ terminal 100 holds TIMER1 106 in a reset state and clocks the air quality 81 (good/poor) at the D input of Air Quality Flip-Flop 105 to the Q output 114. This stored value of air quality is used later in setting the wait time for initiating a supplemental ventilation cycle. The T1 interval 119 defines the time allocated for introducing outside air 20 into the structure to improve indoor air 4 quality, with additional time allowed for any and all sensor 14 to sufficiently stabilize their response. This is the time interval set aside to sample the flow rate controlled air inlet stream 9 and make a determination regarding its suitability for introduction into the structure.

Assuming good air quality, TIMER1 106 continues to run after time interval T1 119 and all air valve 10 and pressure relief valve 33 remain open. At time interval T2 110, TIMER1 106 provides a positive transition at the first input terminal 110 of OR gate 107. The positive going output 118 of OR gate 107 is applied to the R input of Flip-Flop 88 and causes it to assume the reset state, forcing its Q output 117 low and its Q\ output 100 high. The resulting low level at the Q output 117 turns off relay 89, causing contacts A and B to both return to their de-energized normally closed state, as indicated. Line 56 of connector 85 is now connected to common 31 through the normally closed contact of the B section, which causes all air valve 10 and pressure relief valves 33 to move to their fully closed position. Section A is returned to its normally closed state and 24 VAC 30 is removed from fan out 27, returning control of the system fan to the HVAC system 2. The ventilation cycle has been completed but the HVAC system 2 continues a normal cycle until the thermostat is satisfied and the 24 VAC 30 signal is removed at fan 26. The processor 15 then waits for another fan 26 signal from the system thermostat to start another ventilation cycle.

The low level at the Q output 117 of Flip-Flop 88 at time interval T2 119 is applied to the R (reset) input to second TIMER2 91, allowing it to begin counting. The high level on the Q\ output 100 of Flip-Flop 88 at time interval T2 119 causes TIMER1 106 to go to its reset state and clocks the air quality 81 at terminal D of Flip-Flop 105 to its Q output 114, as previously discussed. Time interval T2 110 defines the standard ventilation period for each system fan cycle when outside air quality is good. It is initiated when a system fan cycle begins but is independent of the length of time the system fan is on. When T2 110 occurs, all air valve 10 and pressure relief valve 33 close and the processor 15 is waiting for another system fan cycle from the HVAC system 2 to initiate another timed ventilation cycle.

At time T2 110, Flip-Flop 88 is reset and supplemental vent cycle TIMER2 91 is enabled to begin counting. Since TIMER2 91 is reset at the beginning of each HVAC system 2 fan cycle, it only produces an output at elapsed time T3 116 when and only when the time off interval of the system fan exceeds the time T3. At time T3, a positive going signal is applied to the first input 116 to AND gate 92. The second input 114 to AND gate 92 is controlled by the Q output of Air Quality Flip-Flop 105. The input air quality 81 from sensor 14 assembly is constantly present at the D input of Flip-flop 105. This level is clocked to the Q output terminal at the end of each ventilation cycle when the Q\ terminal 100 of Flip-Flop 88 is reset to its high state. Flip-Flop 105 then acts to store the air quality state (good/poor) as it exists at the end of each ventilation cycle. This state is then presented as the second input 114 of AND gate 92. It is a logical high if the air quality was good at the end of the previous ventilation cycle and a logical low if the air quality was poor. Assuming good air quality at the end of the previous ventilation cycle, T3 116 causes the output 120 of AND gate 92 to transition to a high state, which is propagated through OR gate 104, then through the third input 84 of OR gate 87 to the S (set) terminal 123 of Flip-Flop 88, forcing its Q output to a logical high and its Q\ output to a logical low. This action resets TIMER2 91 and initiates a supplemental ventilation cycle. The processor 15 completes this ventilation cycle just as if it had been initiated by the HVAC system 2. The closing of the Section A normally open contact of Relay 89 applies 24V AC 30 to fan out 27, which activates the HVAC system 2 fan for the duration of the ventilation cycle. This provides supplemental ventilation cycles based on the quality of outside air 20 during periods when the HVAC system 2 remains off for long periods of time, such as during fall and spring seasons of the year. T3 116 then defines the maximum time interval the HVAC system 2 can be off before a supplemental ventilation cycle is initiated.

Assuming poor air quality at the end of the previous ventilation cycle, the Q output 114 of Flip-Flop 105 is low and the T3 116 signal is blocked from passing through AND gate 92. TIMER2 91 then continues to run until T4 115 occurs. Time interval T4 115 is selected to be a minimum of twice as long as time interval T3 116. At time T4 115, a positive going level change is applied to the first input 115 of OR gate 104, through the output of OR gate 104, to the third input 84 of OR gate 87 and to the S (set) terminal 123 of Flip-Flop 88. This initiates a delayed start ventilation cycle when the air quality was determined to be poor at the end of the previous cycle. If the air quality remains poor, the ventilation cycle is terminated at time interval T1 119, as previously discussed, in order to limit the quantity of poor quality air introduced into the structure. Thus, if the air quality remains poor and the HVAC system 2 is largely inactive, the time delay for sampling the flow rate controlled air inlet stream 9 is lengthened to T4 115 and the ventilation cycle time is shortened to T1 119 (for sampling purposes only). TIMER1 106 AND TIMER2 91 are individually controlled by timing 60 inputs.

When the HVAC system 2 thermostat calls for COOL, 24V AC 30 is applied to cool 29. This AC signal is converted to a logical high dc level at the output terminal 93 of AC-DC Logic Converter 102. This is applied to the S (Set) terminal of HEAT/COOL Flip-Flop 94, which causes the Q output 82 to go to the high state. This level is then available at the HEAT/COOL output terminal 82. The sensor 14 assembly uses the HEAT/COOL output 82 as an input for setting air quality 81. The output 93 of AC-DC Logic Converter 102 is also applied to the input of Logic Inverter 108, where it is inverted and applied as the second input 95 to system reset OR gate 107. The output 118 of OR gate 107 is connected to the R input of Flip-Flop 88 and causes it to assume the reset state, which de-energizing relay 89 to remove 24 VAC 30 at fan out 27 and close air valve 10 and pressure relief valves 33 by grounding the close 56 terminal of connector 85, as previously discussed. In this manner, the system fan is immediately shut down and the ventilation cycle is terminated whenever the compressor is stopped for any reason. This prevents condensate which drains from the cooling coils after a compressor shut down from being forced into the supply plenum 18 and possibly into the air duct 5.

When the HVAC system 2 calls for heat, the application of 24 VAC 30 to heat 28 acts through AC-DC Logic Converter 103 to present a logical high at the R (reset) terminal 96 of Flip-Flop 94, causing it to reset to HEAT status and set the HEAT/COOL 82 output to sensor 14 assembly to a logical low. This logic level is used by circuits on the sensor 14 assembly to provide the option of disabling the humidity sensor located in the flow rate controlled air inlet stream 9 when the HVAC system 2 is operating in the HEAT mode during winter months.

Remote panel port 37 is provided for remote control and status monitoring of the processor 15. Output 83 provides dc operating voltage V+ for the remote panel 36. Common 31 provides a dc ground return for remote panel 36. Valve open 99 provides air valve 10 status (open/close) information. Manual start input 185 provides the second input to OR gate 87 for manually starting a ventilation cycle from remote panel 36 using a momentary switch contact to V+ 83. Air Quality status 112 provides output to the remote panel 36 for informing the occupant of poor outside air quality as the cause for automatically closing down the AQS system to normal ventilation cycles. Disable 111 is applied as the third input to OR gate 107 and provides an input to manually disable the processor 15. This is accomplished by maintaining a constant V+ 83 at disable input 111 of OR gate 107, which is coupled to the output 118 of OR gate 107 to maintain a logical high at the R (reset) terminal of Flip-Flop 88. This maintains Flip-Flop 88 in a permanent reset state and prevents any ventilation cycles from occurring.

Air Quality System Processor Timing Diagrams

Figure 5:
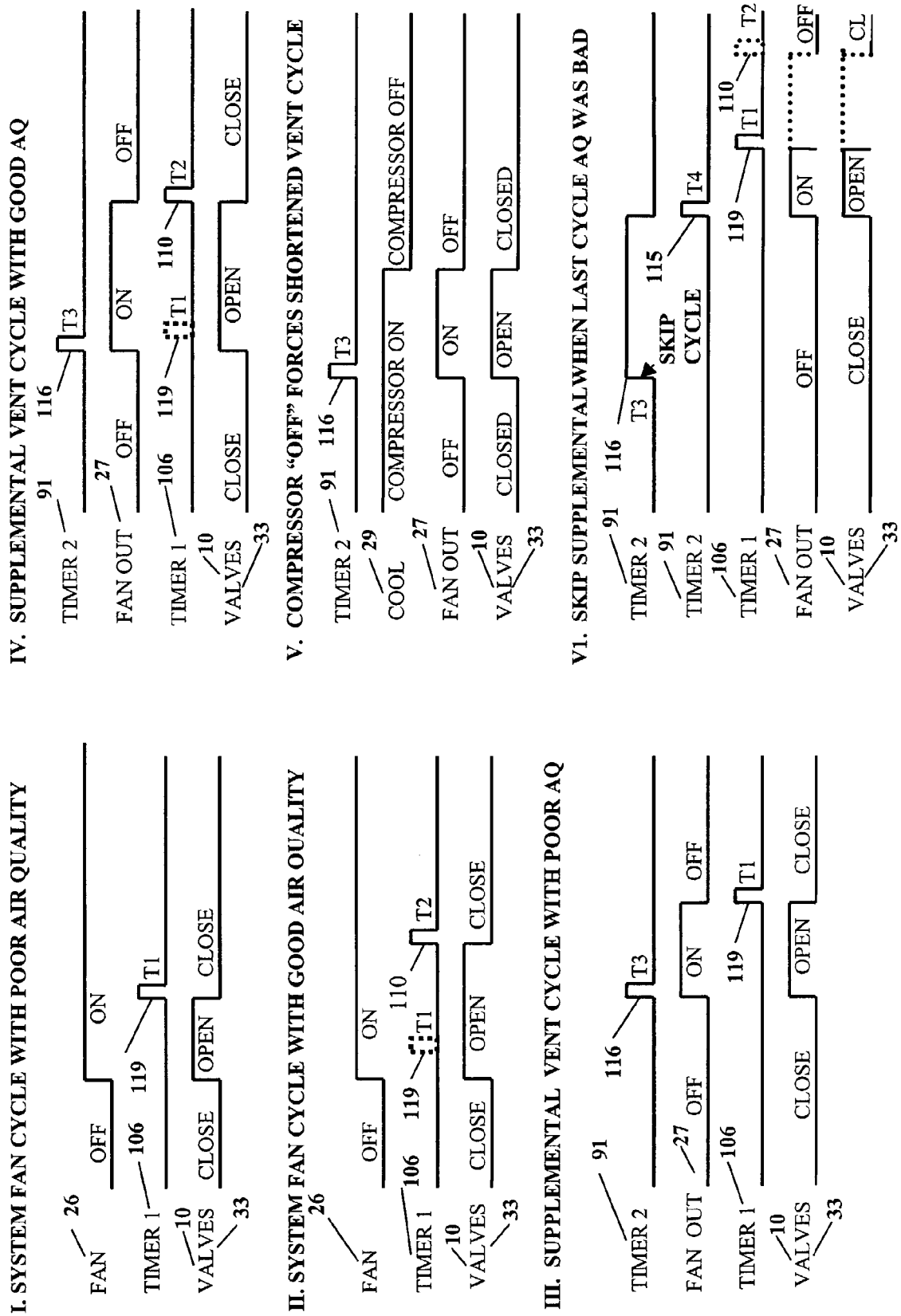
FIG. 5 illustrates a detailed timing diagram for the Air Quality System Processor and Air Valve positioning assembly.

Referring to FIG. 5, Timing diagrams for the Air Quality System Processor 15 are shown. There are six timing scenarios depending on the HVAC system 2 operating cycle times and the quality of outside air inlet stream 1. Each timing scenario is described separately below:

I. System Fan Cycle When Outside Air Quality is Poor

I.

The fan 26 signal is turned on by the system thermostat, enabling the system fan to run. Air valve 10 and pressure relief valve 33 both open. Time interval T1 119 from TIMER1 106 occurs, indicating the end of a normal air quality sampling period. Air valve 10 and pressure relief valve 33 both close. The system fan continues to run until the system thermostat is satisfied and removes the 24VAC 30 input at fan 26.

II. System Fan Cycle When Outside Air Quality is Good

The fan 26 input is turned on by the system thermostat, enabling the system fan to run. Air valve 10 and pressure relief valve 33 both open. Time interval T1 119 from TIMER1 106 occurs but no action takes place because outside air quality is indicated as good by sensors 14. Time interval T2 110 from TIMER1 106 occurs, indicating the end of a normal ventilation cycle. Air valve 10 and pressure relief valve 33 both close. The system fan continues to run until the system thermostat is satisfied and removes the 24VAC input at fan 26.

III. Supplemental Ventilation Cycle When Outside Air Quality is Poor

Time interval T3 116 from TIMER2 91 occurs, indicating an excessively long time since the last HVAC system 2 fan cycle. Fan out 27 is enabled by processor 15 and the system fan is turned on. Air valve 10 and pressure relief valve 33 both open. Time interval T1 119 from TIMER1 106 occurs, indicating the end of a normal air quality sampling period. Fan out 27 is disabled by processor 15 and the system fan is turned off. Air valve 10 and pressure relief valve 33 both close. This cycle is repeated every T3 116 time intervals if the HVAC system 2 remains inactive.

IV. Supplemental Ventilation Cycle When Outside Air Quality is Good

Time interval T3 116 from TIMER2 91 occurs, indicating an excessively long time since the last HVAC system 2 fan cycle. Fan out 27 is enabled by the processor 15 and the system fan is turned. Air valve 10 and pressure relief valve 33 both open. Time interval T1 119 from TIMER1 106 occurs but no action takes place because outside air quality is indicated as good by sensors 14. Time interval T2 110 occurs, indicating the end of a normal ventilation cycle. Fan out 27 is disabled by processor 15 and the system fan is turned off. Air valve 10 and pressure relief valve 33 both close. This cycle is repeated every T3 116 time intervals if the HVAC system 2 remains inactive.

V. Shortened Ventilation Cycle When Compressor is Turned Off

A ventilation cycle is initiated by activation of T3 116 from TIMER2 91. Fan out 27 is enabled by processor 15 and the system fan is turned on. Air valve 10 and pressure relief valve 33 both open. Cool 29 from the thermostat is removed, indicating the compressor is turned off. Fan out 27 is removed by the processor 15, and the system fan is turned off. Air valve 10 and pressure relief valve 33 both close. Shutting down the system fan for a period of time when the compressor is powered down prevents condensate which drips from the cooling coils of the evaporator into the condensate pan from being forced into the supply plenum 18.

VI. Skip Supplemental Cycle When Last Cycle Air Quality was Bad

Time interval T3 116 from TIMER2 91 occurs but is prevented from initiating a supplemental ventilation cycle because poor outside air quality was indicated by sensor 14 at the end of the previous ventilation period. Delayed time interval T4 115 from TIMER2 91 occurs. Fan out 27 is turned on by processor 15 and the system fan is enabled. Air valve 10 and pressure relief valve 33 are opened. Time interval T1 119 from TIMER1 106 occurs. If outside air quality, as indicated by sensors 14, is still poor at this time, fan out 27 is removed by the processor 15, the system fan is turned off, and air valve 10 and pressure relief valve 33 close. If outside air quality, as indicated by sensors 14, is good at time interval T1 119 from TIMER1 106, the ventilation cycle continues until time interval T2 110 from TIMER1 106. At that time, fan out 27 is removed by the processor 15, the system fan is turned off, and air valve 10 and pressure relief valve 33 close. In this manner, the interval between supplemental ventilation cycles is doubled when outside air quality remains poor over extended periods of time. This greatly reduces the volume of unsuitable air introduced into the structure.

Detailed Description of Air Quality Sensor Board

Figure 6:
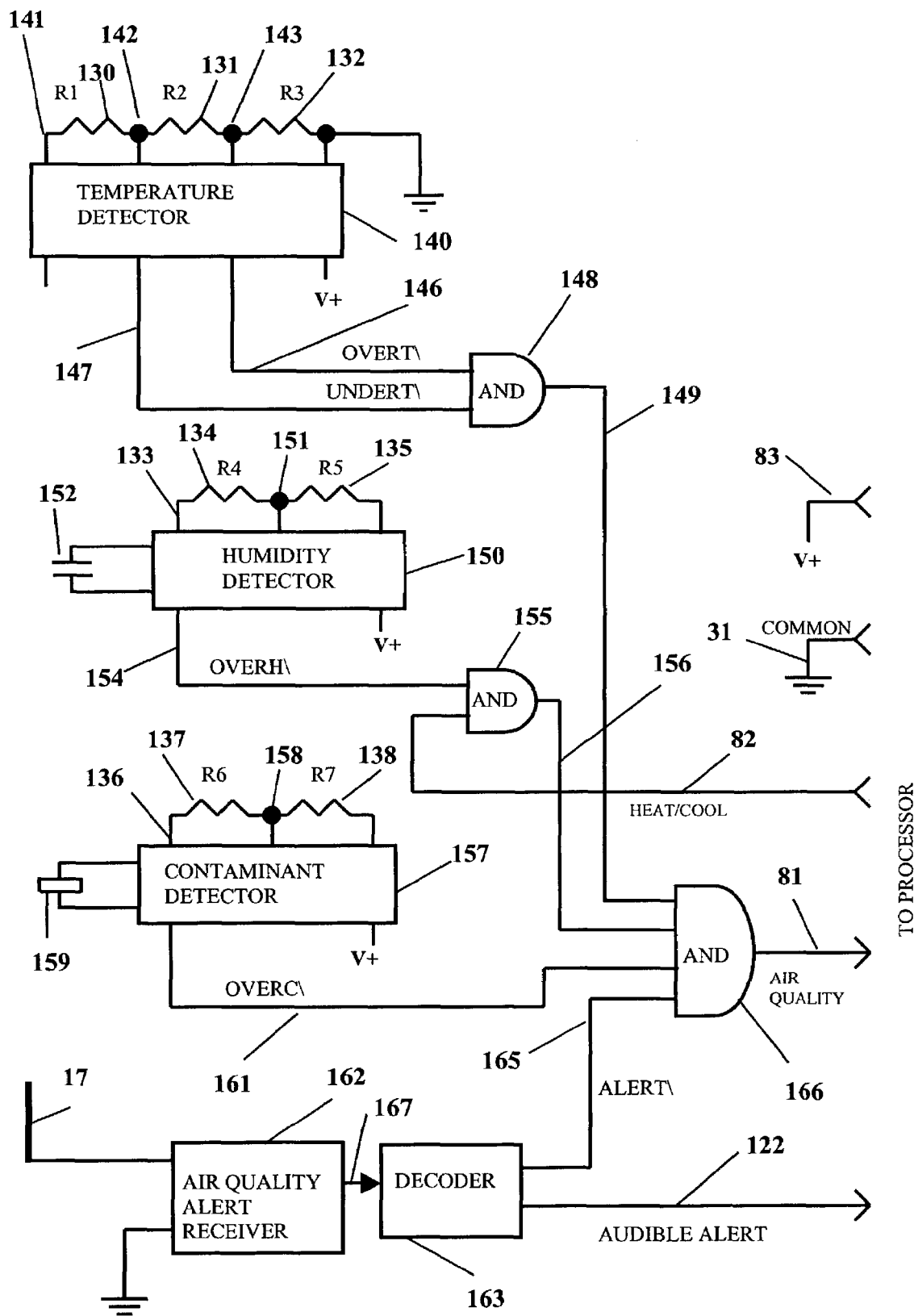
FIG. 6 illustrates a schematic diagram of the Air Quality System sensor assembly.

Referring to FIG. 6, a block diagram of the air quality sensor assembly is shown. The air quality sensor assembly interfaces directly to the Processor 15 as shown in FIG. 1. Temperature detector 140 is positioned within the flow rate controlled inlet air stream 9 and provides a precision reference output voltage 141 for driving a resistive divider network consisting of R1 130, R2 131 and R3 132. The precision voltage at resistive divider point 143 establishes the desired high temperature set point limit above which outside air 20 is prevented from being introduced into the structure. The voltage at divider point 142 establishes the desired low temperature set point limit below which outside air 20 is prevented from being introduced into the structure. Output OVERT\ 146 is logically low for outside air 20 inlet temperatures higher than the high temperature limit setting 143 and logically high for outside air 20 inlet temperatures lower than the high temperature limit setting 143. Output UNDERT\ 147 is logically low for outside air 20 inlet temperatures lower than the low temperature limit setting 142 and logically high for outside air 20 inlet temperatures higher than the low temperature limit setting 142.

Temperature Detector 140 outputs OVERT\ 146 and UNDERT\ 147 are presented as inputs to AND gate 148. AND gate 148 provides an output 149 which is logically low if either input is logically low, indicating an outside air 20 inlet temperature which is outside the acceptable range. AND gate 148 provides an output 149 which is logically high only if both inputs are logically high, indicating an acceptable outside air 20 inlet temperature between the high and low limits. This output 149 is provided as one input to AND gate 166.

Humidity Detector 150 provides a precision reference output voltage 133 for driving a resistive divider network consisting of R4 134 and R5 135. The voltage at divider point 151 establishes the desired humidity level above which outside air 20 will be prevented from entering the structure. Humidity sensor 152 is positioned within the flow rate controlled inlet air stream 9 and interfaces with humidity detector 150 to provide the desired control. Output OVERH\ 154 is logically low for outside air 20 inlet humidity levels higher than the setting 151 and logically high for outside air 20 inlet humidity levels lower than the limit setting 151. Output OVERH\ 154 is presented as one input to AND gate 155. The second input to AND gate 155 is the HEAT/COOL signal 82 from the Processor 15 (FIG. 1). The output 156 from AND gate 155 follows input OVERH\ 154 when the HEAT/COOL 82 input signal is logically high and is forced logically low when the HEAT/COOL 82 input is logically low, indicating the HVAC system 2 is in the heat 28 mode. This acts to disable humidity detector 150 when the HVAC system 2 is set to operate in the heat 28 mode. Output 156 from AND gate 155 is presented as the second input to AND gate 166.

Contaminant detector 157 provides a precision reference output voltage 136 for driving a resistive divider network consisting of R6 137 and R7 138. The voltage at divider point 158 establishes the desired contamination level above which outside air is prevented from entering the structure. Contamination sensor 159 is positioned within the flow rate controlled inlet air stream 9 and interfaces to contamination detector 157 to provide this control. Output OVERC\ 161 is logically low for outside air 20 inlet contamination levels higher than the limit setting 158 and logically high for outside air 20 inlet contamination levels lower than the limit setting 158. Output OVERC\ 161 is presented as the third input to AND gate 166.

Air quality alert receiver 162 has telecommunication device 17 for reception of air quality alert data. Telecommunication device 17 may include a radio or satellite antenna, a conventional or cable TV, telephone line, an Internet connection, or any other kind of wired or wireless communication device. Output 167 from air quality alert receiver 162 is applied to the input of decoder 163. The decoder 163 output, ALERT\ 165, is logically low when active local air quality alerts are being received and logically high when no local air quality alerts are being received. Output ALERT\ 165 is presented as the fourth input to AND gate 166.

The output air quality 81 of AND gate 166 is logically high when inputs 149, 156, 161, and 165 are all logically high, indicating acceptable air quality from all detectors. The output air quality 81 of AND gate 166 is logically low when any one of inputs 149, 156, 161, or 165 is logically low, indicating poor air quality from at least one air quality detector. The output air quality 81 of AND gate 166 is presented as an input to Processor 15, where it is used to set conditions under which outside air 20 is allowed to enter a structure. Output Audible alert 122 from decoder 163 is input to Processor 15 for routing to Remote Panel 37, where it serves to generate audible alert sounds for the occupants to warn of local alert conditions.

Detailed Description of Schematic Diagram of Remote Panel

Figure 7:
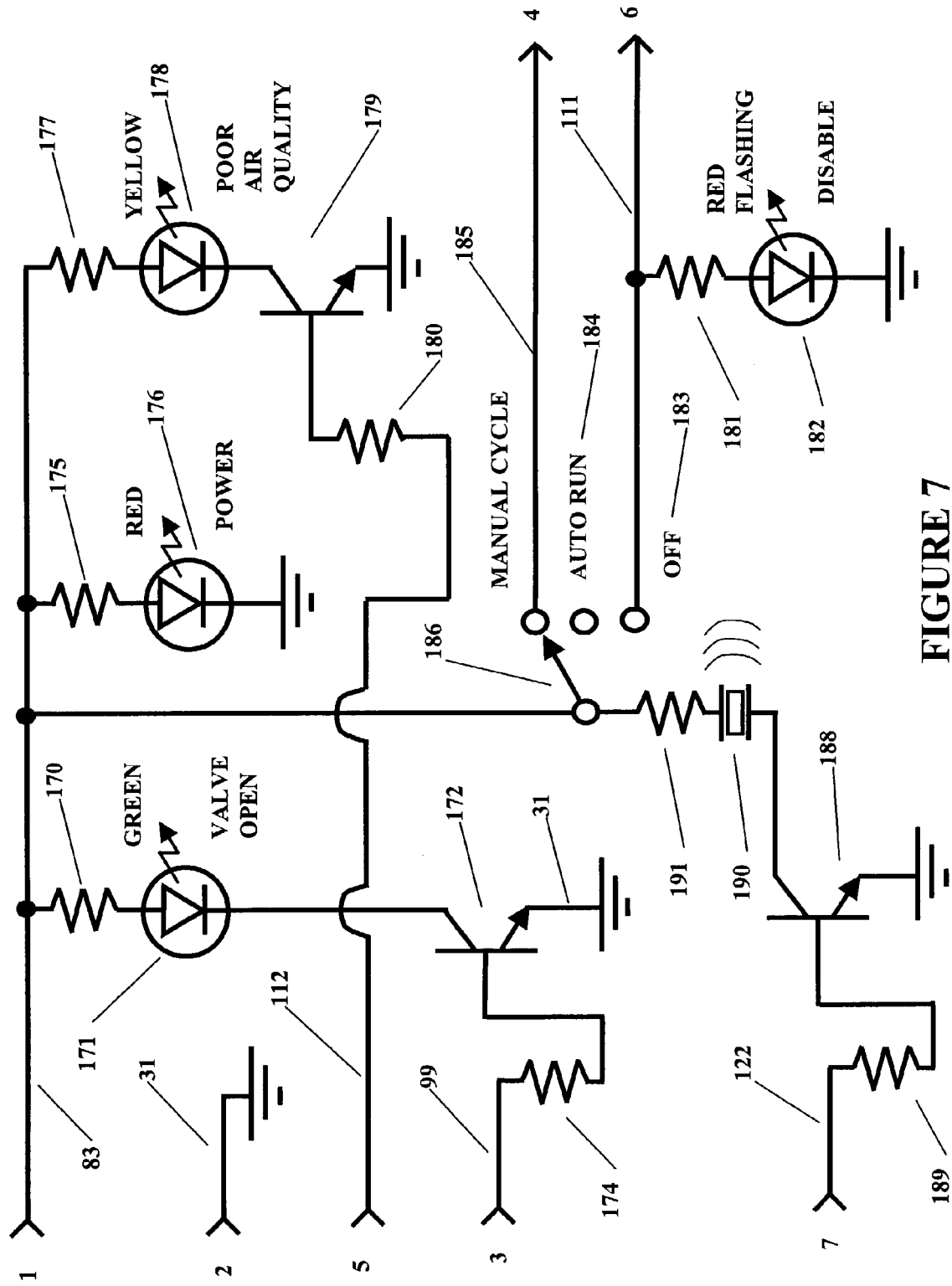
FIG. 7 illustrates a schematic diagram of the Remote Panel.

Referring to FIG. 7, there is a schematic diagram of the remote panel 36 illustrating the connection to the processor 15 (FIG. 4) via the remote panel port 37. DC power 83 provides dc operating voltage V+ for the remote panel 36. Common 31 provides a dc ground return. Valve open 99 provides air valve 10 status (open/close) input. Manual start 185 provides an output for manually starting a ventilation cycle. AQ status 112 provides an air quality status input to the remote panel 36. Disable 111 provides an output to manually disable the processor 15. Resistor 170 controls the amount of current that flows through green LED 171. The base input of Transistor 172 is controlled by the valve open 99 input signal via resistor 174 and causes the green LED 171 to be illuminated when the air valve 10 is open. Resistor 175 controls the amount of current that flows through red LED 176 to provide an indication when DC power 83 is applied. Resistor 177 controls the amount of current that flows through yellow LED 178. The base input of Transistor 179 is controlled by the AQ status 112 via resistor 180 and causes the yellow LED 178 to be illuminated when the air quality is poor. Resistor 181 controls the amount of current that flows through red flashing LED 182 which is illuminated when switch 186 is placed in the off 183 position to disable the air quality system. Placing switch 186 in the manual start 185 position provides an output of manual start 185, which causes the processor 15 to initiate a manual ventilation cycle. Placing the switch 186 in the auto run 184 position allows the processor 15 to operate in the automatic mode for normal and supplemental ventilation cycles. An audible alert 122 controls the base of transistor 188 via resistor 189 to enable power to be supplied to audible alert transducer 190 via current limiting resistor 191.

Detailed Description of Diagrammatic View of Remote Monitor Plate

Figure 8:
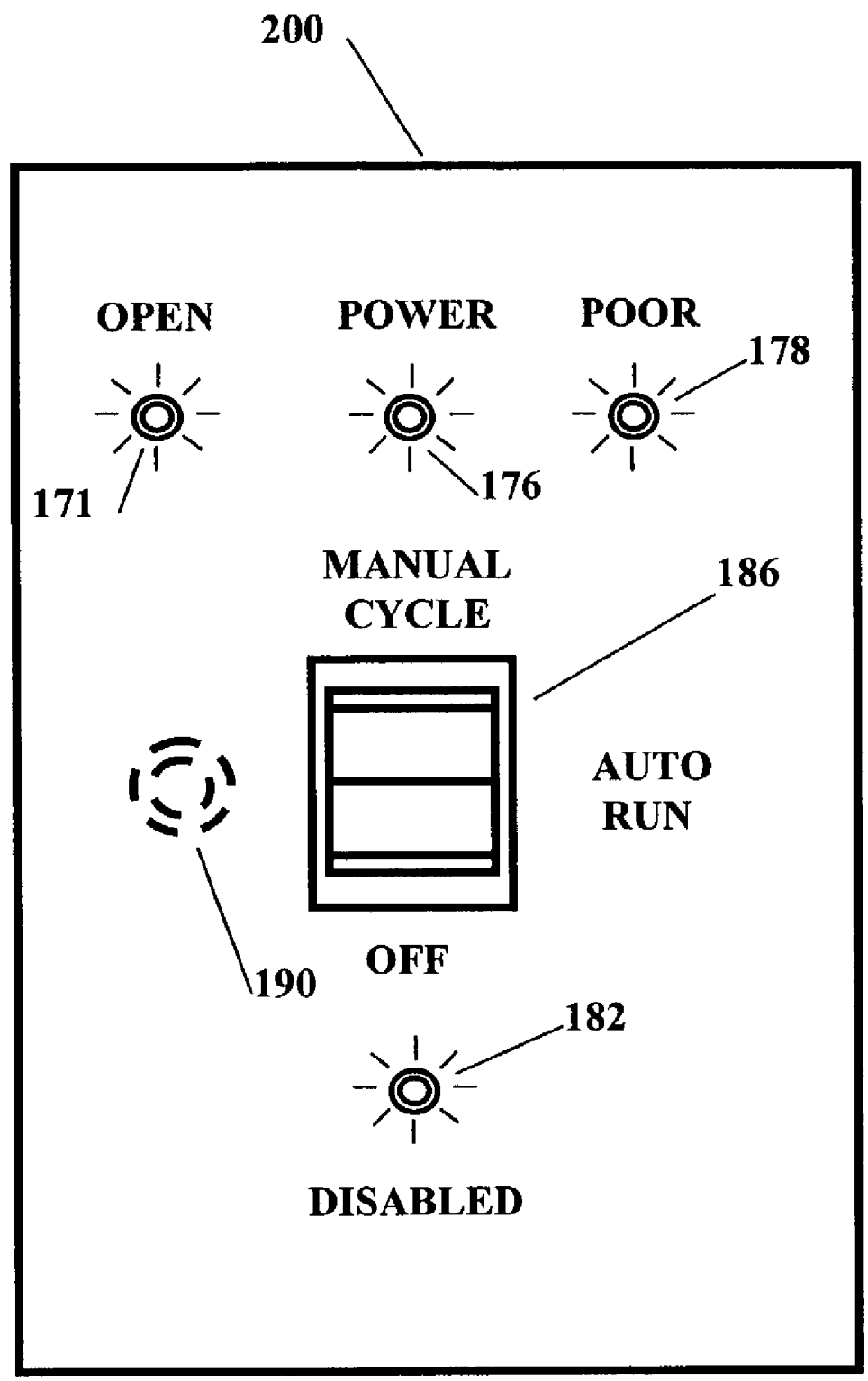
FIG. 8 illustrates a pictorial view of the Remote Panel Plate.

Referring to FIG. 8, there is a diagrammatic view of the remote display panel 200 showing in the upper left hand corner, the green LED 171, indicating the air valve 10 is open, in the upper center, the red LED 176, indicating DC power is present and in the upper right corner, the yellow LED 178, indicating air quality is poor. The switch 186 is located in the center of the remote display panel 200. The red flashing LED 182, indicating the air quality system is disabled, is located in the lower center and the audible alert transducer 190 is located in the center left portion of the remote display panel 200.

Detailed Description of the Test Box

Figure 9:
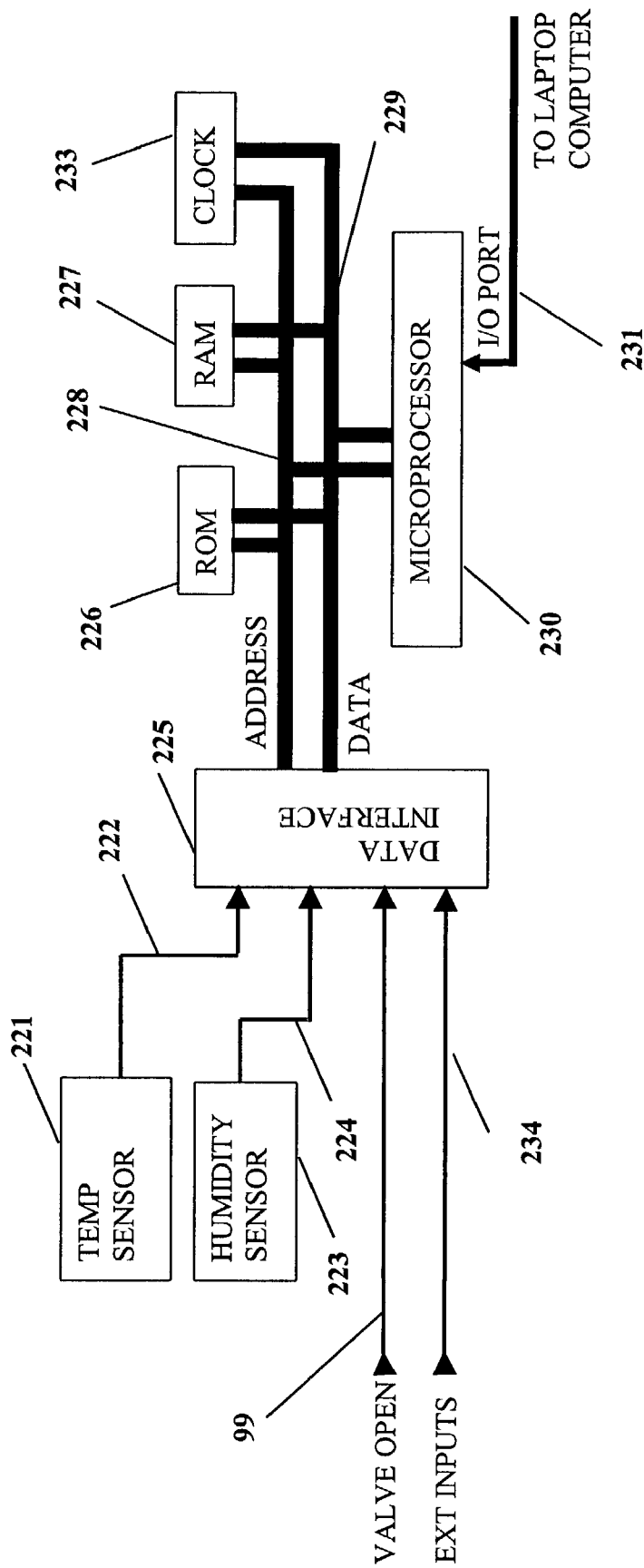
FIG. 9 illustrates a detailed block diagram of the Test Box.

The Test Box 38 is shown in FIG. 9. The internal temperature sensor 221 provides an output 222 that is connected as one input to data interface 225. The internal humidity sensor 223 provides an output 224 that is connected as the second input to data interface 225. The position of air valve 10 is presented as the third input, valve open 99 to data interface 225. The fourth input 234 to data interface 225 provides for additional external sensor inputs. Microprocessor 230 is first connected to a computer (laptop or desktop) through I/O port 231 for downloading of set-up and data logging instructions, including selection of input channels, sampling intervals, start and stop times and setting of the real time clock 233.

Microprocessor 230 uses an input address bus 228 and a bi-directional data bus 229 to sample each programmed input channel at the sample times specified in the download and store these samples in onboard RAM 227 for later retrieval and analysis. Basic data logging program routines are contained in onboard read only memory ROM 226.

The Test Box 38 is disconnected from the laptop or computer and placed in the flow rate controlled air inlet stream 9 where it continues to sample and store sensor input data and air valve 10 open/close condition at programmed time intervals. At the end of the testing period, the unit is retrieved and re-connected to the computer, where special data gathering and analysis programs are employed to report test results and provide guidance to the technician regarding any adjustments that are needed at timing 60 inputs to processor 15. Depending on the number of channels included and the sampling intervals selected, data gathering and logging periods of weeks or even months are possible.

What is claimed is:

1. The method of monitoring locally broadcast air contamination data to control ventilation airflow into a structure, comprising the steps of:
   receiving locally broadcast air contamination data using any data communication means;
   providing said air contamination data to at least one processor that produces a control signal in response to said air contamination data;
   disposing at least one air control device in at least one outside ventilation air stream;
   fully opening at least one air control device in response to the control signal that provides for outside ventilation airflow into a structure; and
   fully closing at least one air control device in response to the control signal that provides for no outside ventilation airflow into a structure.

2. The method of claim 1 wherein the locally broadcast air contamination data includes terrorist attack air quality alerts.

3. The method of claim 1 wherein the locally broadcast air contamination data includes disaster related air quality alert data.

4. The method of sampling and controlling an outside ventilation air stream to determine if it is suitable for introduction into at least one inlet end of an HVAC system, comprising the steps of:
   receiving locally broadcast air contamination data;
   providing locally broadcast air contamination data to a processor that produces an air valve control signal in response to the data input and the HVAC system controls;
   disposing at least one air valve between at least one outside ventilation air stream and at least one HVAC system inlet;
   fully opening at least one air valve in response to the air valve control signal that provides for outside ventilation airflow into the HVAC system; and fully closing at least one air valve in response to the air valve control signal that provides for no outside ventilation airflow into the HVAC system.

5. The method of claim 4 wherein the locally broadcast air contamination data includes terrorist attack air quality data that are displayed on a remote panel with optional audible output capabilities.

6. The method of claim 4 wherein the locally broadcast air contamination data includes disaster related air quality alert data that are displayed on a remote panel with optional audible output capabilities.

7. A method for sampling and controlling an outside ventilation air stream to determine if it is suitable for introduction into at least one inlet end of an HVAC system, comprising the steps of:
    disposing at least one sensor in an outside ventilation air stream;
    sampling at least one sensor with a processor;
    producing an air valve control signal in response to at least one sensor input and the HVAC system controls;
    disposing at least one air valve between at least one outside ventilation air stream and at least one HVAC system inlet;
    fully opening at least one air valve in response to the air valve control signal that provides for outside ventilation airflow into the HVAC system; and
    fully closing said at least one air valve in response to the air valve control signal that provides for no outside ventilation airflow into the HVAC system.

8. The method of claim 7 wherein the step of sampling comprises monitoring at least one sensor for a period of time sufficient to obtain an output that is an accurate representation of the outside ventilation air stream.

9. The method of claim 7 wherein the step of controlling is augmented by processor inputs from the HVAC system and a processor fan control output to the HVAC system which allows supplemental ventilation cycles of outside ventilation airflow.

10. The method of claim 9 wherein supplemental ventilation cycles of outside ventilation airflow are terminated upon the end of a cooling cycle to reduce condensate ingress from the cooling coils.

11. The method of claim 9 wherein supplemental ventilation cycles of outside ventilation airflow are overridden when at least one sensor indicates the outside air inlet stream is not suitable for introduction into at least one inlet end of an HVAC system at the end of the previous outside ventilation airflow period.

12. The method of claim 9 wherein the desired lengths of said supplemental ventilation cycles of outside ventilation airflow are determined by calculating the average volumetric rate of outside ventilation air that is introduced into the HVAC system over long periods of time to achieve a desired average daily volumetric rate.

13. The method of claim 7 wherein the step of producing an air valve control signal is augmented by controlling the length of time that the air valve is open.

14. The method of claim 7 wherein:
    at least one pressure relief valve is disposed between any interior space in the structure and any exterior space outside the structure;
    said at least one pressure relief valve is fully opened in response to said air valve control signal that additionally provides for contaminated air to be exhausted from a structure; and
    said at least one pressure relief valve is fully closed in response to said air valve control signal that additionally provides for contaminated air to not be exhausted from a structure.

15. The method of claim 7 wherein at least one sensor is a temperature sensor.

16. The method of claim 15 wherein one temperature sensor is used to provide both a high temperature limit and a low temperature limit.

17. The method of claim 7 wherein at least one sensor is a humidity sensor.

18. The method of claim 17 wherein the humidity sensor is ignored when the HVAC system is in a heating mode.

19. A ventilation airflow sampling and control system for receiving and using locally broadcast air contamination data to control ventilation airflow into a structure comprising:
    a receiver that decodes locally broadcast air contamination data from any data communication system;
    a processor that monitors locally broadcast air contamination data to produce a control signal in response to the data input;
    at least one air control device disposed in at least one outside ventilation air stream;
    at least one air control device positioned fully open in response to said control signal that provides for outside ventilation airflow into a structure; and
    said at least one air control device positioned fully closed in response to said control signal that provides for no outside ventilation airflow into a structure.

20. The system of claim 19 wherein said locally broadcast air contamination data includes terrorist attack air contamination data that are displayed on a remote panel with optional audible output capabilities.

21. The system of claim 19 wherein said locally broadcast air contamination data includes disaster related air contamination data that are displayed on a remote panel with optional audible output capabilities.

22. A ventilation airflow sampling and control system for controlling an outside ventilation air stream to determine if it is suitable for introduction into at least one inlet end of an HIVAC system, comprising:
    a receiver that decodes locally broadcast air contamination data from any data communication system;
    a processor that monitors locally broadcast air contamination data to produce an air valve control signal in response to the data input and in response to the HVAC system heat, cool and fan signals;
    at least one air valve disposed between at least one outside ventilation air stream and at least one HVAC system inlet;
    at least one air valve positioned fully open in response to said air valve control signal that provides for outside ventilation airflow into a structure; and
    said at least one air valve positioned fully closed in response to said air valve control signal that provides for no outside ventilation airflow into a structure.

23. The system of claim 22 wherein said locally broadcast air contamination data includes terrorist attack air quality data that are displayed on a remote panel with optional audible output capabilities.

24. The system of claim 22 wherein said locally broadcast air contamination data includes disaster related air quality data that are displayed on a remote panel with optional audible output capabilities.

25. A ventilation airflow sampling and control system for controlling an outside ventilation air stream to determine if it is suitable for introduction into at least one inlet end of an HVAC system, comprising:
- at least one sensor disposed in at least one outside ventilation air stream;
- at least one sensor monitored by a processor;
- an air valve control signal produced in response to at least one sensor input and in response to the HVAC system heat, cool and fan signals;
- at least one air valve disposed between the outside ventilation air stream and at least one HVAC system inlet;
- at least one air valve fully opened in response to the air valve control signal that provides for outside ventilation airflow into the HVAC system; and
- said at least one air valve fully closed in response to the air valve control signal that provides for no outside ventilation airflow into the HVAC system.

26. The system of claim 25 wherein at least one sensor is monitored for a period of time sufficient to obtain an output that is an accurate representation of the outside ventilation air stream.

27. The system of claim 25 wherein said HVAC system fan signal is controlled by the processor to allow supplemental ventilation cycles of outside ventilation airflow.

28. The system of claim 27 wherein supplemental ventilation cycles of outside ventilation airflow are terminated upon the end of a cooling cycle to reduce condensate ingress from the cooling coils.

29. The system of claim 27 wherein said supplemental ventilation cycles of outside ventilation airflow are overridden when at least one sensor indicates the outside air inlet stream is not suitable for introduction into at least one inlet end of an HVAC system at the end of the previous outside ventilation airflow period.

30. The system of claim 27 wherein the desired length of said supplemental ventilation cycles of outside ventilation are determined by using a test box to determine the volume of outside ventilation air that is introduced into the HVAC system over long periods of time.

31. The system of claim 25 wherein the volume of outside ventilation airflow introduced into the HVAC system is controlled by the length of time that at least one air valve is open.

32. The system of claim 25 wherein:
- at least one pressure relief valve is disposed between any interior space in the structure and any exterior space outside the structure;
- at least one pressure relief valve is fully opened in response to said air valve control signal that additionally provides for contaminated air to be exhausted from a structure; and
- said at least one pressure relief valve is fully closed in response to said air valve control signal that additionally provides for contaminated air to not be exhausted from a structure.

33. The system of claim 25 wherein at least one sensor is a temperature sensor.

34. The system of claim 33 wherein one temperature sensor is used to provide both a high temperature limit and a low temperature limit.

35. The system of claim 25 wherein at least one sensor is a humidity sensor.

36. The system of claim 35 wherein the humidity sensor is ignored when the HVAC system is in a heating mode.

37. The method of monitoring locally broadcast air contamination data to control ventilation airflow into a structure, comprising the steps of:
- receiving locally broadcast air contamination data using any data communication means;
- providing said air contamination data to a processor that produces an air valve control signal in response to said air contamination data;
- disposing at least one air valve between at least one supplemental fan and at least one outside ventilation air stream;
- fully opening at least one air valve in response to the air valve control signal that provides for outside ventilation airflow into a structure; and
- fully closing at least one air valve in response to the air valve control signal that provides for no outside ventilation airflow into a struture.

38. The method of claim 37 wherein the locally broadcast air contamination data includes terrorist attack air quality data that are displayed on a remote panel with optional audible output capabilities.

39. The method of claim 37 wherein the locally broadcast air contamination data includes disaster related air quality alert data that are displayed on a remote panel with optional audible output capabilities.

40. A method for sampling and controlling an outside ventilation air stream to determine if it is suitable for introduction into a structure, comprising the steps of:
- disposing at least one sensor in an outside ventilation air stream;
- sampling at least one sensor with a processor;
- producing an air valve control signal in response to at least one sensor input;
- disposing at least one air valve between at least one supplemental fan and at least one outside ventilation air stream;
- fully opening at least one air valve in response to the air valve control signal that provides for outside ventilation airflow into a structure; and
- fully closing said at least one air valve in response to the air valve control signal that provides for no outside ventilation airflow into a structure.

41. A ventilation airflow sampling and control system for controlling an outside ventilation air stream to determine if it is suitable for introduction into a structure, comprising:
- a receiver that decodes locally broadcast air contamination data from any data communication system;
- a processor that monitors locally broadcast air contamination data to produce an air valve control signal in response to the air contamination data input;
- at least one air valve disposed between at least one supplemental fan and at least one outside ventilation air stream;
- at least one air valve positioned fully open in response to said control air valve signal that provides for outside ventilation airflow into a structure; and
- said at least one air valve positioned fully closed in response to said air valve control signal that provides for no outside ventilation airflow into a structure.

42. The system of claim 41 wherein said locally broadcast air contamination data includes terrorist attack air quality data that are displayed on a remote panel with optional audible output capabilities.

43. The system of claim 41 wherein said locally broadcast air contamination data includes disaster related air quality alert data that are displayed on a remote panel with optional audible output capabilities.

44. A ventilation airflow sampling and control system for controlling an outside ventilation air stream to determine if it is suitable for introduction into a structure, comprising:

at least one sensor disposed in an outside ventilation air stream;

at least one sensor monitored by a processor;

an air valve control signal produced in response to at least one sensor input;

at least one air valve disposed between at least one supplemental fan and at least one outside ventilation air stream;

at least one air valve fully opened in response to the air valve control signal that provides for outside ventilation airflow into a structure; and said at least one air valve fully closed in response to the air valve control signal that provides for no outside ventilation airflow into a structure.

* * * * *